Figure 1:
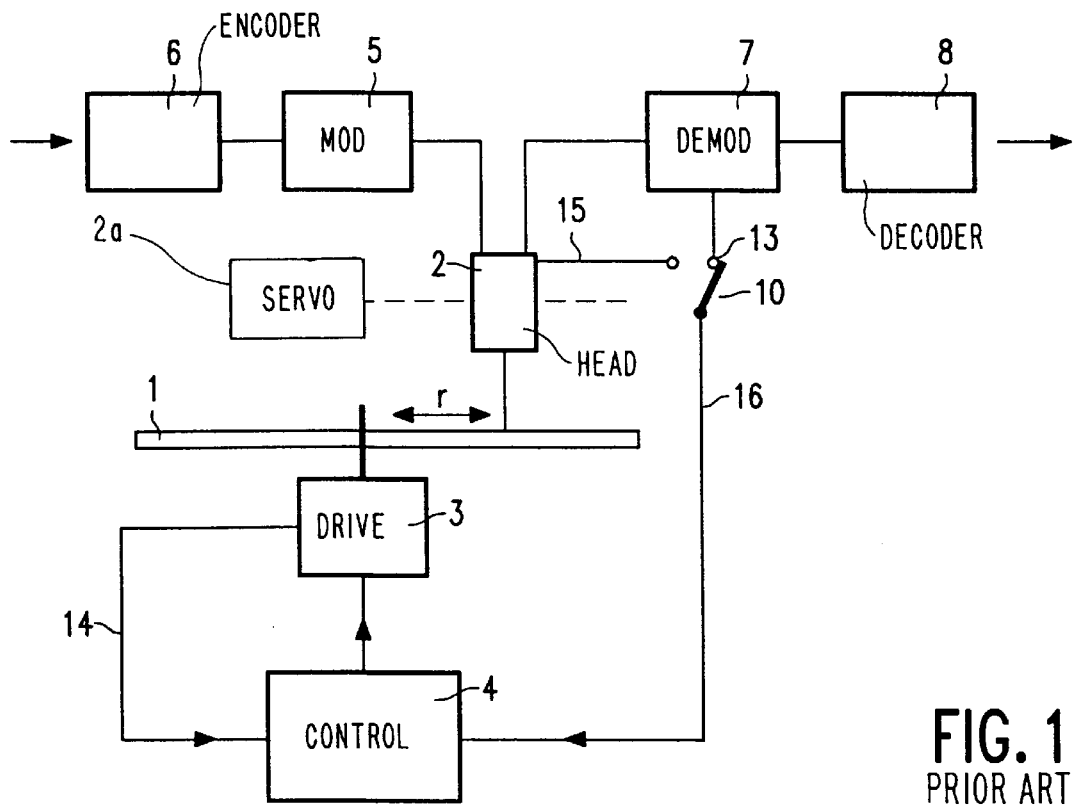

United States Patent [19]
Stan et al.

[11] Patent Number: 6,075,670
[45] Date of Patent: *Jun. 13, 2000

[54] DEVICE FOR SCANNING A DISC-SHAPED INFORMATION CARRIER WITH CONTROLLED CHANGES IN ANGULAR AND LINEAR VELOCITIES

[75] Inventors: Gheorghe S. Stan; Johannus L. Bakx, both of Eindhoven, Netherlands

[73] Assignee: U.S. Philips Corporation, New York, N.Y.

[*] Notice: Under 35 U.S.C. 154(b), the term of this patent shall be extended for 461 days.

[21] Appl. No.: 08/538,517

[22] Filed: Oct. 3, 1995

[30] Foreign Application Priority Data

Apr. 28, 1995 [EP] European Pat. Off. ............. 95201101

[51] Int. Cl.$^7$ .................................................. G11B 15/46
[52] U.S. Cl. .......................................... 360/73.03; 369/50
[58] Field of Search .................................. 360/73.03, 48; 369/50

[56] References Cited

U.S. PATENT DOCUMENTS

| | | | |
|---|---|---|---|
| 4,492,992 | 1/1985 | Rooney | 360/73.03 |
| 4,514,771 | 4/1985 | Stark | 360/73.03 |
| 4,750,059 | 6/1988 | Syracuse | 360/73.03 |
| 4,780,866 | 10/1988 | Syracuse | 360/73.03 |
| 4,901,300 | 2/1990 | Van Der Zande | 369/47 |
| 5,161,142 | 11/1992 | Okano | 369/50 |
| 5,187,699 | 2/1993 | Raaymakers | 369/48 |
| 5,425,014 | 6/1995 | Tsuyuguchi | 369/48 |

FOREIGN PATENT DOCUMENTS

| | | |
|---|---|---|
| 0325329 | 7/1989 | European Pat. Off. . |
| 0326206 | 8/1989 | European Pat. Off. . |
| 290538 | 10/1994 | Japan ................................. 360/73.03 |

*Primary Examiner*—Alan T. Faber
*Attorney, Agent, or Firm*—David T. Treacy

[57] ABSTRACT

For scanning a disc-shaped information carrier at a high average information rate and with minimum access time, the angular velocity is decreased substantially as the radial distance to the scan location increases, while at the same time the linear velocity of track scanning increases substantially. The track may be divided into zones which are scanned with constant angular velocity. With respect to the inner tracks of at least two adjacent zones, or the innermost and the outermost tracks, the angular velocity decreases less than inversely with increase of radial distance, while the linear velocity increases less than proportionally with increase of radial distance.

19 Claims, 3 Drawing Sheets

DEVICE FOR SCANNING A DISC-SHAPED INFORMATION CARRIER WITH CONTROLLED CHANGES IN ANGULAR AND LINEAR VELOCITIES

The invention relates to a device for reading and/or recording information from/in an information track on a disc-shaped information carrier, comprising scanning means for scanning the information track with a linear velocity at a variable distance (r) from a point of rotation of the information carrier, and comprising drive means for causing the information carrier to rotate at an angular velocity, and control means for controlling the drive means.

BACKGROUND OF THE INVENTION

Such a device is known from U.S. Pat. No. 5,161,142. In the known device a so-termed CLV (Constant Linear Velocity) disc, which is a disc-shaped information carrier on which the information track is filled with information having a constant linear density, is scanned with a Constant Angular Velocity (CAV). If information is to be read from another part of the information track, the scanning means are moved as rapidly as possible to this part of the track by a skip across the tracks to a new radial position. In the known device the angular velocity remains unchanged, so that a short access time to information elsewhere on the disc is realised.

A problem of such a device is that the information scanning velocity close to the centre of the disc is considerably lower than near the outer edge. As a result, the average information scanning velocity is much lower than the maximum information scanning velocity. Also the information processing circuit in the device is required to have a large operational range; that is, to process data having widely varying data rates.

SUMMARY OF THE INVENTION

It is an object of the invention to provide, for example, a device that has a high average information scanning velocity, while the access time after a rapid displacement remains short.

This object is achieved by a device as defined in the opening paragraph, characterized in that the control means are arranged to cause the information carrier to be driven in such a way that the angular velocity of the information carrier substantially decreases with an increasing distance (r), and the linear scanning velocity substantially increases.

The invention is advantageous in that the difference between the minimum and maximum operational angular velocities is smaller than when recording or reading operations are carried out with a constant linear velocity, so that the adaptation of the angular velocity in the case of a rapid radial displacement remains limited. In a device according to the invention, a relatively low-power motor and motor drive may be used. This not only restricts the weight and size, but also the energy consumption, the heat build-up and mechanical vibrations.

A further embodiment for the device is characterized in that the control means are arranged to set the angular or linear velocity in such a way that a first period of time necessary for the pick-up means to reach another part of the information track by a rapid radial displacement is longer than or equal to a second period of time necessary to adapt the linear velocity for a rapid radial displacement to a speed at which the information can be processed. This embodiment is advantageous in that, given a specific maximum information processing rate and the physical parameters of the device, the optimum average information rate is obtained with a minimum access time.

A further embodiment for the device is characterized in that the control means are arranged for constant linear velocity scanning during information recording. This embodiment is advantageous in that the recording parameters, such as, for example, the laser power and the shape of the write pulse, need to be determined for only one fixed linear velocity. These parameters continue to be constant during the recording operation.

A further embodiment for the device is characterized in that the control means are arranged for deriving the distance (r) from information in the information track. This embodiment is advantageous in that the distance (r) can be derived from the available signals, for example, addresses, without the necessity of adding another pick-up to the device.

These and other aspects of the invention will be apparent from and elucidated with reference to the embodiments described hereinafter.

BRIEF DESCRIPTION OF THE DRAWING FIGURES

Figure 2:
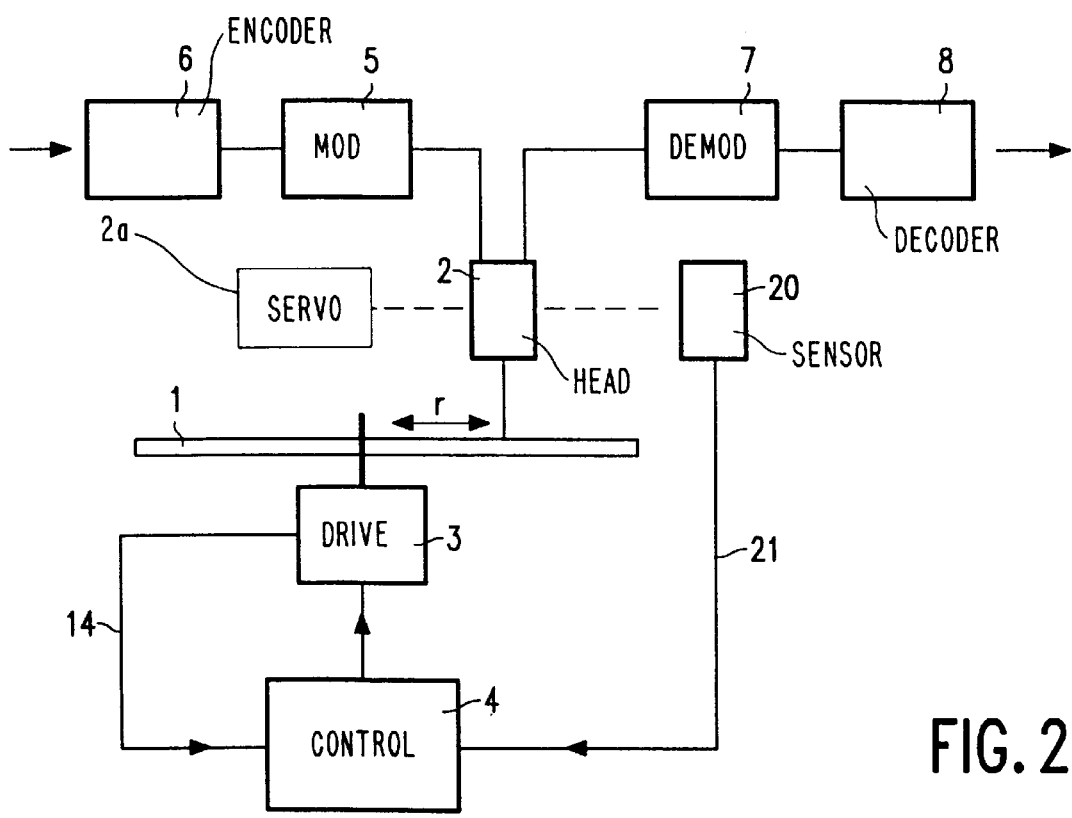
Figure 3:
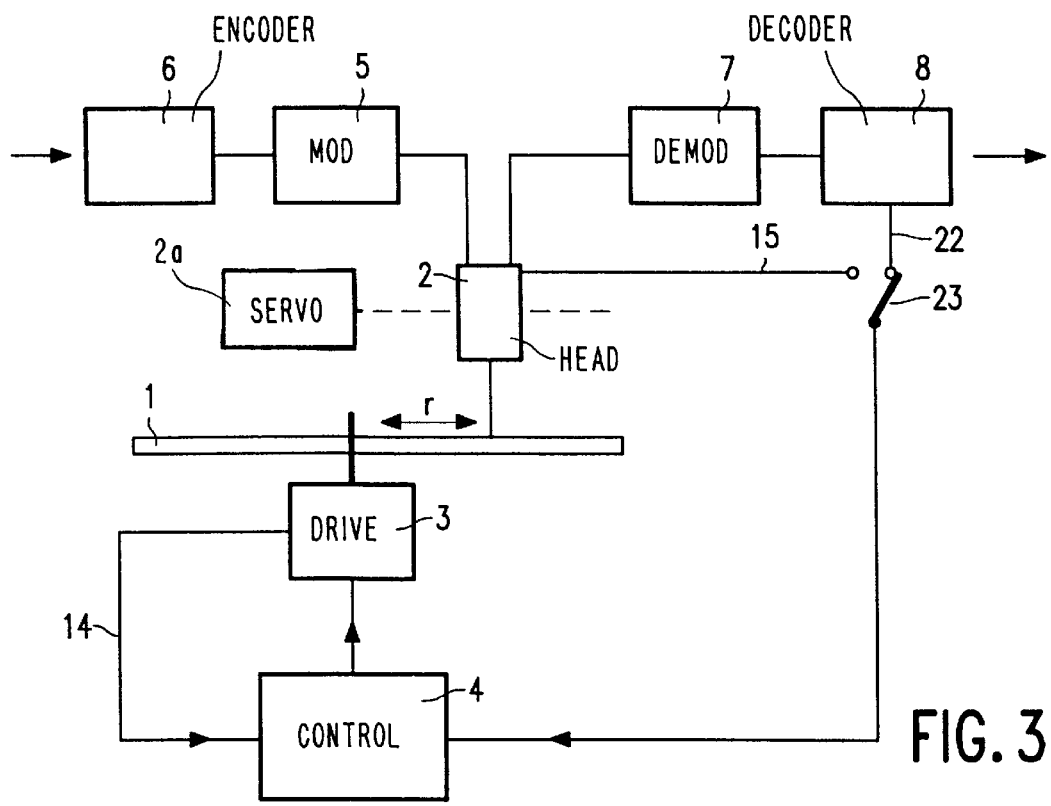
Figure 4A:
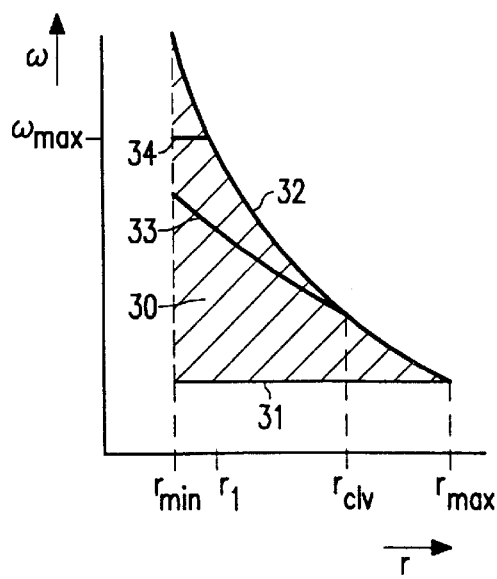
Figure 4B:
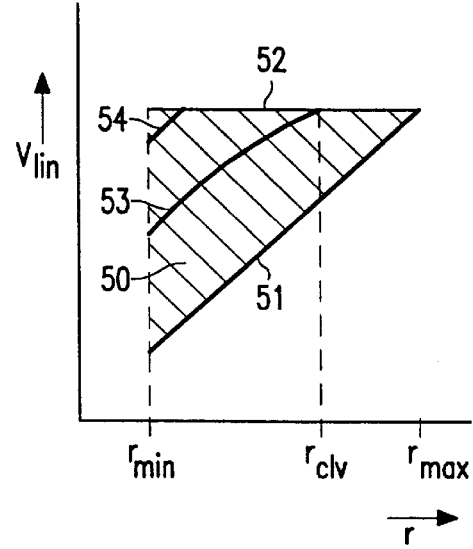
Figure 5:
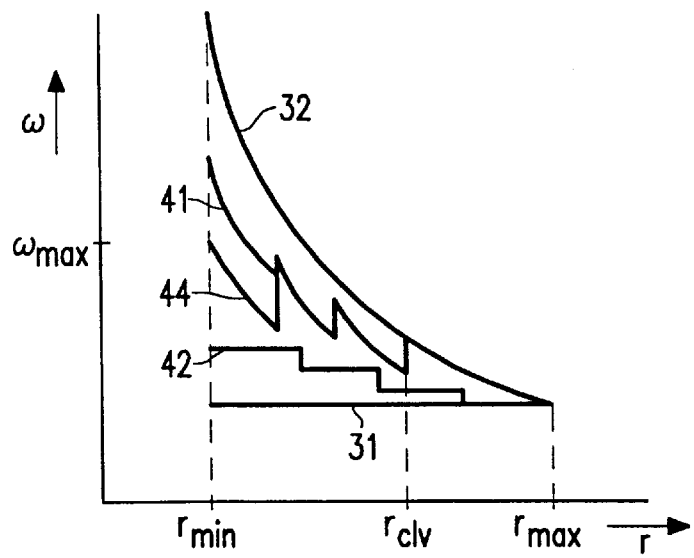
Figure 6:
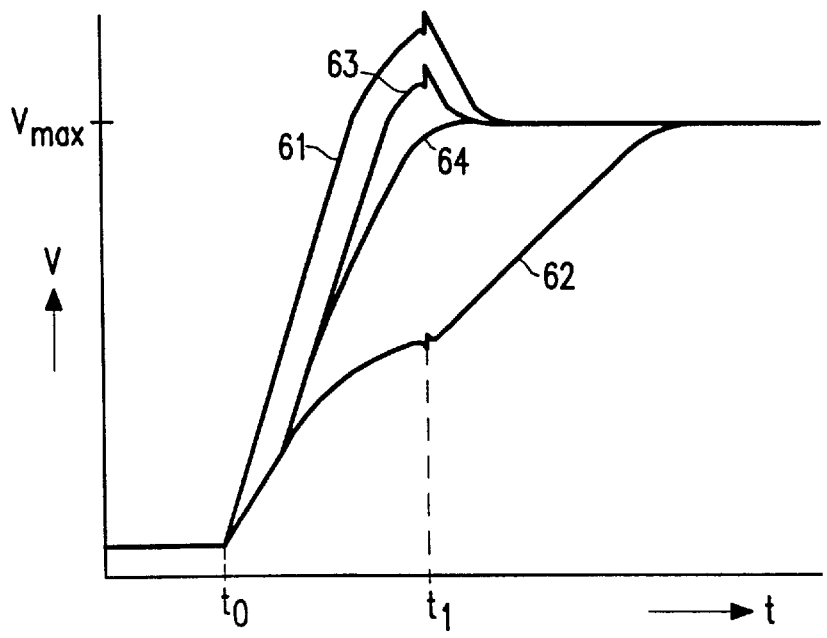

In the drawings:

FIG. 1 is a block diagram of shows a known device for reading and/or recording information, FIG. 2 is a block diagram of shows a device according to the invention with a pick-up, FIG. 3 is a block diagram of shows a device according to the invention when address information from the information carrier is used, FIGS. 4a and 4b show the velocity curves for an increasing distance (r), FIG. 5 shows the velocity curves when r is subdivided into zones, and FIG. 6 shows the velocity curves for the case of a rapid radial displacement.

In the drawing figures, elements corresponding to elements already described carry like reference characters.

DESCRIPTION OF THE INVENTION

FIG. 1 shows a device for reading and/or recording information on an optically, magnetooptically or magnetically recordable disc-shaped information carrier 1, such as, the known CD recordable, or hard disk for computer use. An extensive description of the recordable CD system is found in EP-0326206-A1, corresponding to U.S. Pat. No. 4,901,300, and EP-0325329-A1, corresponding to U.S. Pat. No. 5.187,699. An example of a reading device is the known audio CD cr CD-ROM. A description of the reading of a CD is to be found in the book entitled "Principles of optical disc systems" by Bouwhuis et al., ISBN 0-85274-785-3. The information carrier 1 rotates around a point of rotation and is driven by the drive means 3 of a customary type. The drive means 3 are triggered by control means 4 to which a measuring signal indicative of the angular velocity or linear velocity is applied. The control loop thus formed causes the information carrier 1 to rotate at a desired speed. A scanning unit which comprises a read/write head 2 is located at a distance r from the point of rotation of the disc and can be displaced in radial direction by a servotracking system 2a of a customary type shown schemtically.

During recording, information is fed via encoder 6 to modulator 5, which encoder encodes the information into an information stream with redundancy for error correction.

The encoded and modulated information is recorded at a constant information rate determined by a clock signal. The tracking as well as the linear velocity are controlled via the tracking system and the control loop. For example, when a master disc is manufactured, which is subsequently to be used for manufacturing CD-ROMs, the angular velocity can be controlled by deriving a measuring signal 14 from the drive means 3 and allowing the desired angular velocity to decrease inversely proportionally to r. The recordable information carrier may beforehand be provided with patterns, such as in the sampled servosystem, or a wobbled pregroove, so that a control signal 15 is generated in the read/write head 2. For an extensive description of the manner in which the control signal is generated, reference be made to EP 03262006, or U.S. Pat. No. 4,901,300, which document is deemed incorporated in the description by reference. During recording, the control signal 15 is led to control unit 4 via switch 10, which unit maintains, in dependence on the control signal, a constant value for the linear velocity at which the information carrier 1 is scanned by the read/write head 2. In this manner an information carrier 1 is obtained, whose information density seen in the scanning direction is constant.

During reading, a reading signal produced by the read/write head 2 is decoded by a demodulator 7 and decoder 8 into an information signal while the clock signal 13 is being recovered. The frequency of this clock signal is indicative of the linear velocity at which the information pattern is scanned by the read/write head 2. Switch 10 leads the clock signal 13 to control unit 4 during the reading operation.

In the case of a reading operation according to the so-called CLV system, the rotation is controlled in such a way that a constant linear scanning velocity is obtained, as occurs in the known audio CD player for a CD-DA. For this purpose, the control means 4 are supplied via switch 10 with a linear scanning velocity signal 16, such as said control signal from the servotracking system during the recording operation, or with the recovered clock signal 13 from demodulator 7 during the reading operation. The information is recorded with a constant density in the information track. As a result, a maximum amount of information can be recorded on the disc. In the CLV system the angular velocity depends on the distance r. Since the angular velocity is to be adapted after a rapid displacement of the read/write head 2 to another part of the information track, the motor control will need some time to reach this velocity. For part of this time, that is, as long as the information rate lies outside the operational area of the information processing circuit (i.e. demodulator 7 and decoder 8, modulator 5 and encoder 6, respectively), no information can be processed. A strong motor and a strong motor drive are to be used to obtain a short access time.

During a scanning operation according to the so-called CAV system, the rotation is adjusted in such a way that a constant angular velocity of the information carrier 1 is obtained. For this purpose, the drive means 3 may comprise a sensor which produces a sensing signal 14 which is indicative of the angular velocity. The sensing signal 14 is then applied to the control means 4. When a recording operation is performed according to the CAV system, the information can be recorded at a constant clock rate, so that the density on the information carrier then decreases with an increasing distance r.

When a recording operation is performed according to the CAV system, a constant information density may be obtained by allowing the information rate of the information to be recorded to increase proportionally to the distance r. However, this poses strict requirements on the operational area of the information processing circuit. In addition, the information transfer rate in the case of a small distance r is much smaller than along the outer edge. As a result, the average information transfer rate is much lower than the maximum information transfer rate. The access time after a rapid displacement only depends on the time necessary for reaching the desired part of the information track. A scanning operation according to the CAV system for reading information carriers which have a constant information density in the scanning direction is known from U.S. Pat. No. 5,161,142.

FIG. 2 shows a first embodiment for a device according to the invention. The angular velocity is set here in dependence on the distance r, so that this velocity decreases less than proportionally to an increasing distance r. A signal 21 indicative of the distance r is generated by a position sensor 20 and applied to the control means 4. The control means 4 include, for example, a table from which the angular velocity can be determined for a specific value of signal 21. The angular velocity based upon signal 21 can also be determined in another manner than from a table, for example, from a digital arithmetic unit or from analog signal processing. The determined angular velocity is compared with a sensing signal 14 that indicates the real angular velocity. The driving signal for the drive means 3 is derived in dependence on this comparison.

FIG. 3 shows a second embodiment for a device according to the invention. When an information carrier 1 such as, for example, a CD is used, with address information that indicates the radial position, the distance r can be derived from the information signal 22 coming from the information carrier 1. The absolute time information in the sub-code of the CD signal, or addresses of data sectors on the information carrier 1, such as, on a CD-ROM or a hard disk, can be used for this purpose. Such information which is indicative of the distance r can also be derived from other information patterns such as the pregroove on the information carrier during recording. Control signal 15 contains this information. The control means 4 are supplied through switch 23 with signal 22 or signal 15, from which the angular velocity to be set is determined. The angular velocity is determined and controlled in the way this is done for the first embodiment.

In a third embodiment for the device according to the invention, the linear velocity is set in dependence on the distance r. Control unit 4 is supplied with a signal that is indicative of the real angular velocity i.e. clock signal 13 or signal 15 from switch 10, as is shown in FIG. 1. The sensor and the sensing signal 14 are not necessary now, but may be supplied, as required, for controlling the velocity if the read signal is unreliable, for example, during a rapid displacement. With an increasing distance r a larger linear velocity is set, while the linear velocity increases less than proportionally to increasing r. In the control loop the control means 4 compare the set linear velocity with the signal 16 that indicates the real angular velocity. The driving signal for drive means 3 is derived in dependence on this comparison. The distance r can be sensed by position sensor 20 and presented by means of signal 21, as is shown in FIG. 2.

A fourth embodiment for a device according to the invention is similar to the third embodiment, with the exception that r is derived now from address information of signal 22 or signal 15, as is shown in FIG. 3. Position sensor 20 and signal 21 are lacking here.

A fifth embodiment for a device according to the invention is similar to the previous embodiment, except that the angular velocity in the CLV system is controlled while information is being recorded. The recording parameters such as the recording power and the recording pulse may then have fixed settings.

A sixth embodiment for the device according to the invention is similar to the previous embodiment with the exception that the angular velocity in the CAV system is controlled during the information recording. The clock rate is varied inversely proportionally to r, for example, by coupling a signal 21 or 22 indicative of the distance r to a VCO (Voltage-Controlled Oscillator). Then, r may be determined by a sensor 20 or read from a signal 15 or 22 from the information carrier 1. As a result, there will arise a high, constant information density combined with the constant angular velocity. After a rapid displacement it is then possible to record forthwith, because the angular velocity need not be adapted and there is thus no danger of recording too fast or too slowly, so that information would end up in a wrong area of the information carrier 1.

FIG. 4a shows the behaviour of the angular velocity ω with increasing distance r. For the CAV system this is a horizontal line 31 covering the operational area of the read/write head 2 from the minimum distance $r_{min}$ on the inside to the maximum distance $r_{max}$ along the outer edge of the information carrier 1. In the CLV system the angular velocity according to curve 32 has an inversely proportional relation to the distance r. The area 30 between these two extremes 31 and 32 contains the velocity curves as they are found in embodiments for the device according to the invention. A shorter access time is then reached by restricting the differences of angular velocity with respect to the CLV system. Since a smaller difference of speed is to be overcome in the case of a rapid displacement, the device will again be capable of reading or recording information at an earlier instant. For a rapid displacement the maximum information processing rate is taken into account, as is the maximum angular velocity the drive means are capable of realising and at which the servotracking system is still capable of having the read/write head 2 follow the track. After a rapid displacement, the information rate will more rapidly lie in the operational area of the information processing circuit and a shorter access time will be obtained. In the known CLV system the maximum average information rate is obtained. For still obtaining a maximum average information rate with a short access time, the velocity curve 33 closest possible to the CLV curve 32 is selected.

In a first embodiment for the control means 4, the CLV curve 32 is followed from the outer edge at $r_{max}$ to a specific distance r1. Consequently, the information track having the larger diameters is read and recorded with optimum velocity. From this distance r1 the angular velocity is maintained constant at $\omega_{max}$, as is shown by curve 34. Mechanical restrictions or restrictions as to high angular velocity servotracking are thus taken into account.

In a second embodiment for the control means 4, the maximum information processing rate is taken into account and the access time is maintained at a minimum level. In the case of a rapid displacement to the centre, the information carrier 1 will have to be accelerated until the angular velocity corresponds to the new distance r. The information rate will thus be temporarily lower and the (recovered) clock will follow this lower rate. To this end, the system control may temporarily adjust, as required, the modulator 5 or demodulator 7, respectively. In the case of a rapid displacement from the centre outwards, the information carrier 1 will have to be decelerated. Since the maximum rate of the information processing circuit is limited, the angular velocity must not be too high when the read/write head 2 arrives at the desired part of the information track. A minimum access time prescribes that the time required for decelerating the information carrier is always smaller than or equal to the time necessary for displacing the read/write head 2. The minimum access time is obtained by selecting the velocity curve in such a way that for each distance r the rapid displacement time is, substantially, at least equal to the deceleration time for each rapid displacement from all other operational distances r. The variation for a specific device is given in curve 33. Under the condition of the minimum access time, there will then also arise the maximum average information rate.

The variation of the rapid displacement time for a device will have to be determined to attune the velocity curve thereto. If the rapid displacement time is proportional to the radial displacement, the rapid displacement time can easily be determined. In general, however, the displacement of the read/write head 2 will be effected by first strongly accelerating and then decelerating again. The period of time necessary for adapting the angular velocity will have to be determined from the difference of distance to be covered and the motor parameters. For the CLV curve 32 the difference of angular velocity after a rapid displacement is proportional to the radial displacement added to the distance r. As the rapid displacement takes place over a specific distance closer to the outer edge, so the difference of angular velocity will be smaller and so the necessary deceleration time will be shorter.

For a specific distance $r_{clv}$ it will hold that the rapid displacement time is, substantially, equal to the deceleration time. Without a detrimental effect on the access time, the CLV curve 32 can be followed from distance $r_{max}$ to $r_{clv}$. In this part of the curve 33 the angular velocity is thus totally determined by the maximum rate of the information processing circuit, whereas in the part from $r_{min}$ to $r_{clv}$, the curve 33 is determined by the properties of the motor. Depending on the physical properties of the system, the calculated $r_{clv}$ may also be smaller than $r_{min}$ (in that case the curve will decrease to the known CLV curve) or larger than $r_{max}$ (in that case curve 33 lies completely in the area 30). To be certain that the information can always be processed after a rapid displacement, the point $r_{clv}$ can be selected slightly more towards the outer edge. This creates then a slight margin for physical property tolerance of the device.

In a third embodiment for the control means 4, a higher average information rate is obtained than in the previous embodiment if a minimum access time is not required in all situations, so that, for example, some extra time is allowed for rate adaptation in the case of a rapid displacement over more than ⅔ of the operational area. The maximum velocity upon arrival is then to fall within the clock recovery capture range in the demodulator 7, so that the correct linear velocity is sensed. The decoder 8 starts decoding if the linear velocity has come to within the lock range. The curve then shows a variation partly in the area 30 between the CLV curve 32 and the optimum curve 33.

In a fourth embodiment for the control means 4, the minimum access time is obtained by a velocity variation mainly found in curve 33 and, as required, in curve 34. The desired curve may be approximated, for example, by several fixed setting points. The control means 4 then comprise a simple selection mechanism and the sensor and sensing signal 14 may be omitted. The result is then, it is true, a slightly lower average information rate.

For the above embodiments it holds that a suitable balancing between average access time and average information rate may be made by suitably selecting a curve in the area 30 between the CLV curve 32 and the CAV curve 31.

FIG. 4b shows the variation of the linear scanning velocity $v_{lin}$ plotted against distance r. Curve 51 shows the variation when scanning takes place according to the CAV system, in which the linear velocity thus increases proportionally to the distance r. Curve 52 shows the variation in the case of scanning according to the CLV system, thus with a constant linear velocity. The area 50 includes the possible control curves of a device according to the invention, whereas curves 53 and 54 show the corresponding control curves of curve 33 and 34 in FIG. 4a.

FIG. 5 shows in curve 41 the variation of the angular velocity ω when the operational area of r is subdivided into zones within which the linear scanning velocity is always constant. In the outermost region this linear velocity is equal to the maximum velocity and curve 41 follows curve 32 of the CLV system. In a simple manner, for example, by means of a table, the control means 4 are capable of deriving from distance r what nominal linear velocity is to be set. The zones may be selected to be equal, or become ever wider, for example, in proportion to an increasing distance r. It is also possible to take into account a maximum angular velocity $\omega_{max}$ to be reached by the device, for which a sharper decline of the linear velocity is set in the interior zone, as is shown by curve 44. Curves 41 and 44 each show that for at least some zones the respective angular velocities at the inner tracks of adjacent zones change less than inversely with respect to the distance r of the inner tracks of those zones. Further, from the innermost track to the outermost track the angular velocity changes less than inversely, and the linear velocity increases less than proportionally, with the increase of distance r. The distance r can be derived, as described above, from a sensing signal from sensor 20, or from the information signal 22 by analysing the addresses or the sub-code. For each zone the setting point for the nominal linear scanning velocity can be adapted by the control means 4 and be applied to the control loop to activate the drive means 3.

FIG. 6 shows the variation of the linear velocity v plotted against time t in the case of a large outward displacement at instant t0. In the case of a large rapid displacement it may hold that the time required for adapting the velocity is much shorter than the time necessary for the rapid displacement. The velocity may be set to new values, for example, at the following instants:

a) the new setting is computed from the length of the displacement and is set the moment the displacement commences; the resulting variation is shown in curve 61, b) the previous setting is maintained during the rapid displacement and the new distance r will not be determined from signal 21 or 22 and the new value will not be set until after the rapid displacement; the resulting variation is shown in curve 62, c) during the rapid displacement the value r is constantly computed and the velocity is constantly adapted; the resulting variation is shown in curve 63. During the rapid displacement, r can be determined, for example, by sensor 20 or by counting the tracks that are crossed. If the linear velocity is controlled, as is done in the third embodiment, the velocity during the rapid displacement will be readjusted too strongly in case a). For that matter, the high linear velocity has already been set in the case of a displacement to the outer edge, whereas read/write head 2 is still located far inward. As a result, the rotation will first be accelerated and the velocity v will exceed the maximum velocity value $v_{max}$. However, the maximum processing rate should not be exceeded. To avoid this, the velocity may be set according to, for example, case b) or c) and/or $v_{max}$ may be selected slightly lower. In case b) the rotation will be decelerated too much, so that upon arrival at t1 there is still a specific period of time during which acceleration is to take place. In case c) there may be overshoot within a zone. A further optimization of the manner in which the velocity setting during a rapid displacement is effected could be, for example, the use of a damping in the control, so that the velocity is adjusted rapidly, but overshoot just fails to occur, as is the case, for example, in curve 64. When a sudden displacement towards the centre takes place a complementary effect occurs. Since the velocity is never too high here, method c) can be selected without any objection. Needless to observe that it is alternatively possible to control the desired angular velocity during the rapid displacement, by computing this velocity from the distance r and the linear velocity to be set, and by using a sensor and a signal 14 as has already been discussed with respect to the third embodiment.

In a further embodiment for a device according to the invention, an information carrier 1 is used on which the information density decreases as r increases. For example, the distance r can be divided into zones of constant angular velocity, for example, in accordance with curve 42 in FIG. 5. With a constant clock rate the density within a zone will then decrease with increasing r; the clock is adjusted per zone, so that, substantially, the density in the inner zone is greater than the density in the outer zone. Also the clock rate may be varied inversely proportionally to r, for example, by coupling a signal 21 or 22 indicative of the distance r to a VCO (Voltage-Controlled Oscillator). This causes a constant density to develop, for example, per zone. During recording, such a coupling can be used over the entire distance r in combination, for example, with a constant angular velocity. r may then be determined by a sensor 20 or from a signal 15 or 22 read from the information carrier 1. After a rapid displacement, recording is possible forthwith, because the angular velocity need not be adapted, whereas still a high, constant, information density is obtained.

Combinations of variable density, angular velocity and linear velocity make an optimum tuning possible of the average information rate, the access time and the total storage capacity of the information carrier 1. There should be observed that combinations essentially copying the CAV or CLV variation, for example, by approximating the CLV curve by zones of constant angular velocity, are already known. In that case, however, the angular velocity or linear velocity shows a variation, however, only within a zone different from that of the known CAV or CLV systems, and the angular velocity or linear velocity continues to be constant, substantially.

What is claimed is:

1. A device for scanning an information track on a disc-shaped information carrier, comprising:

scanning means for scanning a location on the information track, drive means for causing relative rotation between the location and the information carrier, at an angular velocity about a point of rotation, the location thereby having a linear velocity of relative movement along the track, means for varying a distance (r) between said location and the point of rotation, and control means for controlling the drive means, characterized in that said control means is arranged to control the drive means so as to cause the relative angular velocity to decrease substantially with increasing distance (r), and to cause the linear velocity to increase substantially with increasing distance (r).

2. A device as claimed in claim 1, characterized in that said drive means rotates said information carrier about an axis through said point of rotation, said scanning means includes a scanning head, and said means for varying moves said scanning head radially with respect to said axis.

3. A device as claimed in claim 1, characterized in that said control means are arranged to change said relative rotation such that a first period of time, required to allow said location to be moved to another part of the information track by a rapid variation of said distance, is equal to or longer than a second period of time required to change the relative rotation such that the linear velocity resulting from the changed relative rotation and said rapid variation corresponds to a linear velocity at which the information can be processed.

4. A device as claimed in claim 1, characterized in that said control means are arranged to change said relative rotation such that for locations between a first distance corresponding to the outermost track and a second distance, the linear velocity is substantially equal to a maximum velocity; and for locations between the second distance and a third distance corresponding to the innermost track, the linear velocity is less than the maximum velocity.

5. A device as claimed in claim 4, characterized in that said control means are arranged to change said relative rotation such that a first period of time, required to allow said location to be moved to another part of the information track by a rapid variation of said distance, is equal to or longer than a second period of time required to change the relative rotation such that the linear velocity resulting from the changed relative rotation and said rapid variation corresponds to a linear velocity at which the information can be processed, and the second distance is the smallest distance for which the first and second periods of time are substantially equal.

6. A device as claimed in claim 5, characterized in that the control means are arranged to set the linear velocity such that the first and second periods of time are substantially equal for locations between the second distance and the third distance.

7. A device as claimed in claim 4, characterized in that said control means are arranged to change said relative rotation such that a first period of time, required to allow said location to be moved to another part of the information track by a rapid variation of said distance, is equal to or longer than a second period of time required to change the relative rotation such that the linear velocity resulting from the changed relative rotation and said rapid variation corresponds to a linear velocity at which the information can be processed, and said control means are arranged to set the linear velocity such that the first and second periods of time are substantially equal for locations between the second distance and the third distance.

8. A device for scanning an information track on a disc-shaped information carrier, where said track includes an innermost track, an outermost track, and a multiplicity of tracks therebetween, comprising:

scanning means for scanning a location on the information track, drive means for causing relative rotation between the location and the information carrier, at an angular velocity about a point of rotation, the location thereby having a linear velocity of relative movement along the track, means for varying a distance (r) between said location and the point of rotation, and control means for controlling the drive means, characterized in that said control means is arranged to control the drive means so as to cause the relative angular velocity to decrease substantially, but less than inversely with the increase of distance (r), as said location is moved from said innermost track to said outermost track; and to cause the linear velocity to increase substantially, but less than proportionally with the increase of distance (r), as said location is moved from said innermost track to said outermost track.

9. A device as claimed in claim 8, characterized in that said drive means rotates said information carrier about an axis through said point of rotation, said scanning means includes a scanning head, and said means for varying moves said scanning head radially with respect to said axis.

10. A device as claimed in claim 8, characterized in that said drive means is a means for rotating said information carrier about said point of rotation, and the control means sets the angular velocity in dependence on the distance (r).

11. A device as claimed in claim 8, characterized in that the control means is arranged to cause the drive means to scan with a constant linear velocity while information is being recorded.

12. A device as claimed in claim 8, characterized in that the control means is arranged to derive the distance (r) from information in the information track.

13. A device as claimed in claim 8, characterized in that said control means are arranged to change said relative rotation such that a first period of time, required to allow said location to be moved to another part of the information track by a rapid variation of said distance, is equal to or longer than a second period of time required to change the relative rotation such that the linear velocity resulting from the changed relative rotation and said rapid variation corresponds to a linear velocity at which the information can be processed.

14. A device as claimed in claim 8, characterized in that the control means is arranged to set the linear velocity in dependence on the distance (r).

15. A device as claimed in claim 8, characterized in that an operational area of the distance (r) is subdivided into a number of zones each having an inner track, said drive means is a means for rotating said information carrier about said point of rotation, and the control means sets the linear velocity at a constant velocity determined by the zone, such that for at least one zone the angular velocity decreases less than inversely with increase of distance between the inner tracks of the at least one zone and an adjacent zone.

16. A device as claimed in claim 8, characterized in that said control means are arranged to change said relative rotation such that for locations between a first distance corresponding to the outermost track and a second distance, the linear velocity is substantially equal to a maximum velocity; and for locations between the second distance and a third distance corresponding to the innermost track, the linear velocity is less than the maximum velocity.

17. A device as claimed in claim 16, characterized in that said control means are arranged to change said relative rotation such that a first period of time, required to allow said location to be moved to another part of the information track by a rapid variation of said distance, is equal to or longer than a second period of time required to change the relative rotation such that the linear velocity resulting from the changed relative rotation and said rapid variation corresponds to a linear velocity at which the information can be processed, and the second distance is the smallest distance for which the first and second periods of time are substantially equal.

18. A device as claimed in claim 17, characterized in that the control means are arranged to set the linear velocity such that the first and second periods of time are substantially equal for locations between the second distance and the third distance.

19. A device as claimed in claim 16, characterized in that the control means are arranged to set the linear velocity such that the first and second periods of time are substantially equal for locations between the second distance and the third distance.

* * * * *